July 24, 1962 W. A. ROBINSON 3,046,410
FREQUENCY DIVIDER SYSTEMS
Filed May 14, 1959
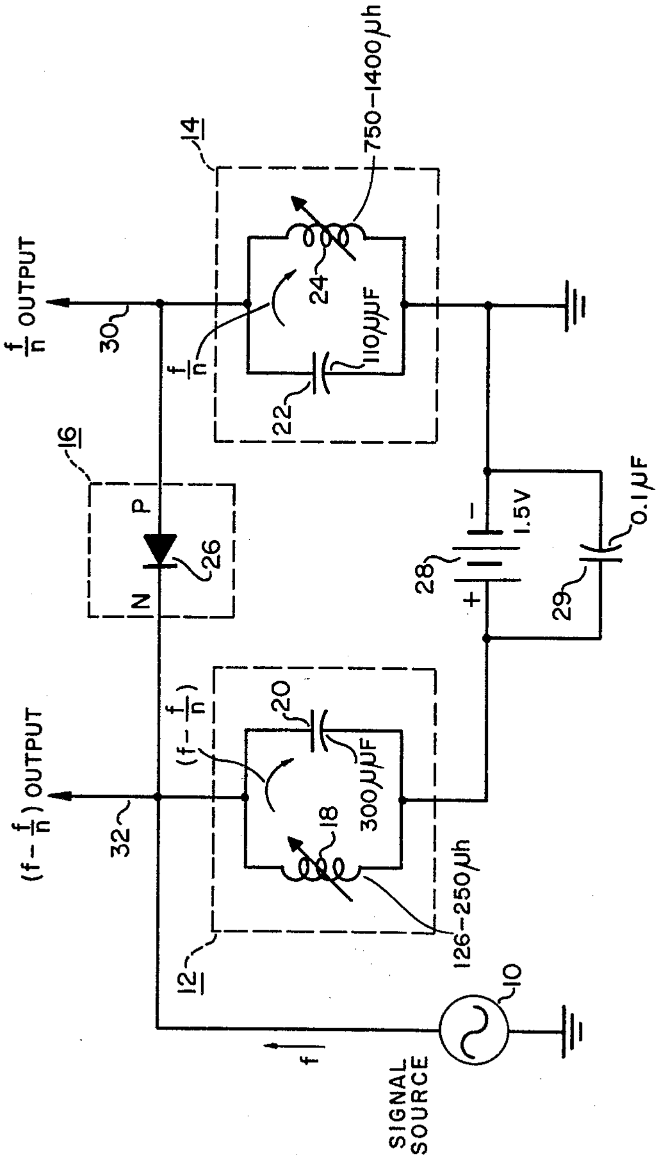
INVENTOR
WESLEY A. ROBINSON
BY Jerry A. Dinardo
AGENT
Albert Rosen
ATTORNEY United States Patent Office 3,046,410
Patented July 24, 1962

3,046,410

FREQUENCY DIVIDER SYSTEMS

Wesley A. Robinson, Santa Monica, Calif., assignor to Space Technology Laboratories, Inc., Los Angeles, Calif., a corporation of Delaware Filed May 14, 1959, Ser. No. 813,296
10 Claims. (Cl. 307—11)

This invention relates to frequency divider systems of the type useful in radio-frequency circuitry, and more particularly to novel and improved means for simultaneously generating and amplifying any one of a number of subharmonics of an input signal without the use of any power other than that provided by the input signal.

Frequency division of radio-frequency signals is usually accomplished by the use of one or more scaling units or regenerative dividers. The scaling units conventionally take the form of a combination of several bistable devices, such as multivibrators, and generally require many such stages in order to perform division by numbers greater than two. Scaling units also have a limitation on the highest frequency which they can effectively handle. In the art of high frequencies above 10 megacycles per second, for example, frequency division is usually accomplished by the use of regenerative dividers which require two or more tubes or transistors and associated circuit elements. The resulting equipment may become relatively complex and bulky. Consequently, these previous frequency divider systems have not proven entirely satisfactory.

Accordingly, it is an object of this invention to provide a novel and improved frequency divider arrangement which is capable of operation at relatively high microwave frequencies, and which is relatively simple and inexpensive in construction.

It is a further object to provide an improved frequency divider system characterized in simplicity and low bulk, and that is free of power requirements other than that provided by the input signal to be divided.

The foregoing and related objects are realized in a frequency divider system capable of receiving an input signal and simultaneously generating and amplifying any one of a number of subharmonics of the signal without the use of any signal power other than that provided by the input signal. According to the invention a parametric network is provided wherein the signal to be subjected to division is used to supply reactance changing signal energy for the network. (A parametic network is one where two or more signals are mixed by a nonlinear reactance to produce amplification.) In one embodiment of the invention the reactance changing signal, commonly referred to as a "pumping" signal, is applied to a network made up of two resonant circuits coupled together by a variable, nonlinear reactance device, the reactance of the device being determined by the reactance changing signal. The frequency of the reactance changing signal is related to the resonant frequencies of the resonant circuits in such a way as to produce the desired frequency division. One resonant circuit is tuned to the output frequency desired, which is a predetermined subharmonic of the input signal frequency. The other resonant circuit is tuned to a frequency equal to the difference between the input signal frequency and the frequency of the desired subharmonic signal. The two resonant circuits give rise to regeneration to produce a strong signal at the desired subharmonic frequency.

The single figure of the drawing is a schematic representation of a frequency divider circuit illustrating the principles of the invention.

Referring to the drawing, there is illustrated a signal source 10 for generating the radio frequency signal to be subjected to division. This signal, the input signal, has a given fundamental frequency $f$ which is to be divided by some desired integer $n$ or a function of $n$ equal to $(n-1)/n$. The signal from the source 10 is fed to a parametric amplifier network which in this embodiment includes a first resonant circuit 14 and a second resonant circuit 12; the two resonant circuits are coupled together by a variable, nonlinear reactance device 16.

In greater detail, the first resonant circuit 14 is a high impedance resonant circuit and comprises a parallel arrangement of an inductor 24 and a capacitor 22. This first resonant circuit 14 is tunable, as by means of the variable inductor 24, so as to resonate at the desired subharmonic frequency $f/n$. (Alternatively the inductor 24 may be fixed and the capacitor 22 variable so as to provide the desired tuning for resonance at the desired subharmonic frequency $f/n$. The second resonant circuit 12 is also a tunable impedance circuit and similarly includes a parallel combination of a capacitor 20 and a variable inductor 18. (Here, too, the inductor 18 may instead be fixed and the capacitor 20 variable.) The inductor 18 is adjustable to tune the second resonant circuit 12 to a frequency which is related in a predetermined manner with respect to the fundamental frequency $f$ of the signal source 10 and the resonant frequency $f/n$ of the first resonant circuit 14. This predetermined relationship specifies that the resonant frequency of the second resonant circuit 12 be a frequency equal to the difference $$\left(f-\frac{f}{n}\right)$$

between the fundamental frequency $f$ and the subharmonic frequency $f/n$. Thus the sum of the two resonant frequencies is equal to the frequency of the signal source.

In using a circuit arrangement wherein two high impedance resonant circuits, illustrated here as tank circuits, are connected in parallel across a signal source with frequency relationships specified above such that the signal frequency is substantially greater than either of the resonant frequencies, each of the tank circuits will appear to present a capacitive impedance and will not tend to oscillate. The placing of a variable reactance device with a regenerative loop circuit across which a fundamental frequency is applied will tend to support harmonic oscillations. The usual variable reactance device used in frequency multiplication or division is a multiple element device such as a vacuum tube or transistor.

The variable reactance device 16 through which the two resonant circuits 12 and 14 are coupled comprises a variable capacitance device in the form of a semiconductor diode 26. The diode 26 is biased in the reverse direction by means of a battery 28 connected in series with the resonant circuits 12 and 14 and the diode 26. A capacitor 29 may be connected across the battery 28 to present a low impedance to the radio-frequency currents flowing in the system. As is known, a semiconductor diode can be made to act as a nonlinear capacitance device by biasing the diode in the reverse direction, a nonlinear capacitance device being one whose capacitance varies nonlinearly with the voltage impressed thereacross. The phenomena by which variable capacitance characteristics are obtainable from a back-biased diode are believed to be based on the fact that when the diode is biased to prevent current flow therethrough there is a capacitive charge existing between the diode elements or layers. The magnitude of the bias controls not only the amount of the charge, but also the effective spacing of the charged layers. In other words, as the charge increases it simultaneously presents the charged layers in an effectively closer relationship, thus changing the capacitance of the variable reactance device as well as the charge on the layers. By maintaining a bias, by such means as a battery 28, at a magnitude which will prevent any conductance in the diode 26 during contemplated operation, the semiconductor diode 26 becomes a desirable variable reactance device 16. Thus, when the signal generated by the source 10 is applied to the semiconductor diode 26, through appropriate input means or leads, the signal causes the diode 26 to vary its capacitance at a rate equal to the fundamental frequency $f$ of the applied signal. As a result, positive pulses of fundamental frequency $f$ encounter a different impedance than negative pulses of the fundamental frequency $f$ to create a signal of the type derived from a vacuum tube operated as a class B amplifier. In this way, harmonic frequencies are created in the signal applied to the resonant circuit 14, and as a result the signal applied to the resonant circuit 12 has subtracted therefrom distorted wave form energy which results in the developing of harmonics across the second resonant circuit 12. The applied signal is thus a reactance changing signal, commonly referred to as a "pumping" signal, since it supplies or pumps the external power through which amplification is derived.

As shown, the pumping signal $f$ is the signal to be subjected to frequency division, and it is particularly noteworthy that it is the sole external source of signal power which is applied to the network. In order to provide the second signal normally required to mix with the pumping signal in the variable reactance device 26, use is made of random noise that is inherently generated in the amplifying network. Inasmuch as random noise includes an infinite number of different frequency noise signals, one of these noise signals will occur at the desired subharmonic frequency $f/n$. This noise signal occurring at the subharmonic frequency, no matter how weak it may be, will be selected by the first resonant circuit 14 in preference to all others since it is the one frequency to which the first resonant circuit 14 is tuned.

In the operation of the system the weak noise signal (at frequency $f/n$), hereinafter called the subharmonic signal, is combined in the variable reactance device 16 with the pumping signal (at the fundamental frequency $f$). As a result of the mixing of these two signals there will be produced, in the second resonant circuit 12, a beat frequency or heterodyne signal at the resonant frequency of the second resonant circuit 12. This heterodyne signal will be amplified. The amplified heterodyne signal, in turn, mixes in the variable reactance device 16 with the pumping signal to produce an amplified subharmonic signal in the first resonant circuit 14. Thus the system regenerates, and the process of alternately amplifying the heterodyne signal and then the subharmonic signal continues until a stable condition is reached. In this way, a signal of substantial power is generated in the first resonant circuit 14 at the subharmonic frequency desired. This amplified signal $f/n$ may be taken from the system by means of a connection to the first resonant circuit 14, as indicated by lead 30. Similarly, in the event that an amplified signal of frequency $$\left(f-\frac{f}{n}\right)$$

is desired, such an amplified signal may be taken by means of a connection to the second resonant circuit 12, as indicated by lead 32.

As shown, the pumping signal $f$ is applied across the second resonant circuit 12 rather than across the first resonant circuit 14. The reason for this is that the resonant frequency $$\left(f-\frac{f}{n}\right)$$

of the second resonant circuit 12 is more easily generated when it is closer to the frequency of the pumping signal than is the subharmonic frequency $f/n$ at which the first circuit 14 is resonant. Accordingly, there is less loading down of the pumping signal by the second resonant circuit 12 than there would be if the pumping signal were applied directly to the first resonant circuit 14.

In one circuit built in accordance with the invention a fundamental or pumping signal having a frequency of 750 kilocycles per second was generated in the signal source 10 and fed to a network arranged as shown in the drawing. The variable reactance device 16 in this example comprised a semiconductor diode 26 manufactured by the International Rectifier Corporation, and bore the code number Semicap 6.8SC20. The diode 26 was biased by a direct current voltage of 1.5 volts from the bias voltage source 28. A bypass capacitor 29 of .1 microfarad was connected across the bias source 28. The first resonant circuit 14 included a fixed capacitor 22 of 110 micro-microfarads, and a variable inductor 24 whose inductance was variable from 750 to 1400 microhenries. The second resonant circuit 12 included a fixed capacitor 20 of 300 micro-microfarads and a variable inductor 18 whose inductance was variable between 126 and 250 microhenries. The inductors 18 and 24 had figures of merit or Q's of the order of about 50 at frequencies in the 100 to 1000 kilocycles per second frequency range. With the frequency of the pumping signal fixed at 750 kilocycles per second, the inductors 18 and 24 were adjusted to tune the resonant circuits 12 and 14 in the manner specified so as to realize frequency division by factors of 2, 3, and 4. That is, in each of these instances the first resonant circuit 14 was tuned to the subharmonic frequency desired and the second resonant circuit 12 was tuned to the difference between the fundamental and subharmonic frequencies, and the resultant output frequencies realized were, respectively, 375, 250, and 185.5 kilocycles per second. In each case the subharmonic frequency signal was coherent with the fundamental input signal over a range of more than 10 kilocycles of the fundamental frequency. This coherent relationship between the output signal and the fundamental frequency signal is particularly advantageous in various synchronized equipments such as computer elements or missilery. Moreover, the coherent relationship facilitates oscillations without the provision of additional energy, as is the case with a parametric amplifier.

Semiconductor diodes of the type described operate satisfactorily as variable reactance devices at least up to 50 kilomegacycles per second. Thus frequency division of high frequency signals having frequencies at least of this order may be realized in accordance with the teachings of this invention. Then, too, while the variable reactance device has been described as being of the variable capacitor semiconductor diode type, it will be appreciated that other types of such devices may instead be used. For example, the nonlinear, variable reactance element may instead take the form of a ferrite element used as a nonlinear, variable inductor.

It will be appreciated that a frequency divider system according to the invention produces not only a subharmonic signal in the first resonant circuit 14, but also produces a heterodyne signal in the second resonant circuit 12. Since the frequency of the heterodyne signal is equal to the difference between the pumping and desired subharmonic signal frequencies, the heterodyne signal will have a frequency which is a multiple of the subharmonic frequency. In other words, the subharmonic signal will be multiplied, in the second circuit 12, by a factor which is one less than the number by which the pumping signal is divided in the first resonant circuit. Thus, if the division is by a factor of three, the heterodyne signal will have a frequency which is ⅔ that of the pumping signal; if the division is by a factor of four, the heterodyne signal will have a frequency which is ¾ that of the pumping signal. Such fractional frequency offsets are readily available in a system according to the invention without the use of additional networks.

It is now apparent that the invention provides greatly simplified means for producing frequency division of radio-frequency signals, and avoids the multiplicity and complexity of circuits required with the use of vacuum tubes and transistors in conventional frequency divider systems. Furthermore, frequency dividers employing parametric amplifier operation according to the invention are not subject to the high frequency limitations common to conventional frequency divider systems.

What is claimed is:

1. A frequency divider system, comprising: first and second resonant circuits; a nonlinear reactance device interconnecting said circuits; and a source of alternating current energy of a predetermined fundamental frequency coupled to said nonlinear reactance device; the resonant frequency of said first resonant circuit being a predetermined subharmonic of said fundamental frequency, and the resonant frequency of said second resonant circuit being substantially equal to the difference between said fundamental and subharmonic frequencies; and said source of alternating current energy being the sole external source of signal power applied to said nonlinear reactance device.

2. A frequency divider system according to claim 1, wherein said nonlinear reactance device comprises a device whose capacitance varies nonlinearly with voltage impressed thereacross.

3. A frequency divider system according to claim 2, wherein said nonlinear capacitance device comprises a semiconductor diode, and wherein the system further includes means connected to bias said diode in its reverse direction.

4. In a frequency divider system of the type wherein an input signal of a fundamental frequency is divided into a predetermined fraction thereof, the combination comprising: first and second resonant circuits; a nonlinear reactance device interconnecting said circuits; and signal input means connected to said device and adapted to feed said input signal thereto; the resonant frequency of said first resonant circuit being a predetermined subharmonic of said fundamental frequency, and the resonant frequency of said second resonant circuit being substantially equal to the difference between said fundamental and subharmonic frequencies, whereby when said input signal is applied to said device without the provision thereto of additional signal energy, signals are generated in said first and second resonant circuits at, respectively, said subharmonic frequency and said difference frequency.

5. A frequency divider system comprising: a series circuit including a first parallel resonant circuit; a second parallel resonant circuit; a semiconductor diode connecting said resonant circuits together; a source of direct current voltage connected to bias said diode in its reverse direction; and a source of alternating current signal voltage coupled to said diode; said alternating current signal voltage source producing a signal of a predetermined fundamental frequency; said first resonant circuit being tuned to a predetermined subharmonic of said fundamental frequency; said second resonant circuit being tuned to the difference between said fundamental and subharmonic frequencies; and said alternating current signal voltage source being the sole external source of signal power present in the system.

6. A frequency divider system capable of dividing a predetermined fundamental frequency into a predetermined subharmonic thereof, comprising: a first parallel resonant circuit including a first capacitor element and a first inductor element connected in parallel, with at least one of said elements being variable through a reactance range capable of tuning said first resonant circuit over a range of frequencies which includes a plurality of subharmonics of said predetermined fundamental frequency; a second parallel resonant circuit including a second capacitor element and a second inductor element connected in parallel, with at least one of said second elements being variable through a reactance range capable of tuning said second resonant circuit over a range of frequencies which includes a plurality of frequencies each equal to the difference between said fundamental frequency and one of said plurality of subharmonics; a semiconductor diode coupling said first and second resonant circuits together in a regenerative loop circuit; a source of direct current voltage connected in series with said first and second resonant circuits and said diode so as to bias said diode in its reverse direction; and a generator of microwave energy having a frequency equal to said predetermined fundamental frequency and connected in said series circuit so as to effectively vary the capacitance of said diode at a rate equal to said fundamental frequency, said generator being the sole external source of signal energy applied to said diode.

7. A frequency divider system comprising: a first high impedance resonant circuit; a second high impedance resonant circuit; a semiconductor diode; a unidirectional voltage source, said first circuit, said second circuit, said diode, and said source being connected in a loop circuit such that said diode is biased in its reverse direction to prevent conductance therethrough; and connection means for applying a high frequency signal across a portion of said loop circuit including a series connection of said diode and said first circuit, said first circuit being tuned to a predetermined subharmonic of the frequency applied, and said second circuit being tuned to another frequency substantially equal to the difference between the high frequency applied and said subharmonic whereby said first circuit will resonate at said subharmonic when said connection means receives said high frequency signal without the provision thereto of additional energy.

8. A frequency divided system for dividing a high frequency input signal of a predetermined frequency $f$ to provide an output signal of a subharmonic $f/n$ comprising: a first high frequency tunable, high impedance parallel resonant circuit having capacitive and inductive characteristics enhancing resonance at the subharmonic frequency $f/n$; a second high frequency tunable, high impedance parallel resonant circuit having capacitive and inductive characteristics enhancing resonance at a frequency $f(1-1/n)$; a semiconductor diode; a unidirectional voltage source, said first circuit, said second circuit, said diode and said source being connected in a loop circuit such that said diode is biased in its reverse direction to prevent conductance in response to the application of the high frequency input signal thereacross and such that any oscillations in either of said resonant circuits tend to regeneratively influence the other of said resonant circuits; connection means for applying the high frequency input signal across a portion of said loop circuit including a series connection of said diode and said first circuit whereby said first circuit will tend to resonate at the said subharmonic frequency $f/n$ without the provision of any additional high frequency energy to said loop circuit; and output connection means for receiving a portion of the energy of the oscillations within said first circuit.

9. A frequency divider system for dividing a high frequency input signal of a predetermined frequency $f$ to provide an output signal of a subharmonic $f/n$ comprising: a first high frequency tunable, high impedance parallel resonant circuit having capacitive and inductive characteristics enhancing resonance at the subharmonic frequency $f/n$; a second high frequency tunable, high impedance parallel resonant circuit having capacitive and inductive characteristics enhancing resonance at a frequency $f(1-1/n)$; a semiconductor diode; a unidirectional voltage source, said first circuit, said second circuit, said diode and said source being connected in a loop circuit such that said diode is biased in its reverse direction to prevent conductance in response to the application of the high frequency input signal thereacross such that any oscillations in either of said resonant circuits tend to regeneratively influence the other of said resonant circuits; connection means for applying the high frequency input signal across a portion of said loop circuit including a series connection of said diode and said second circuit whereby said second circuit will tend to resonate at the said frequency $f(1-1/n)$ without the provision of any additional high frequency energy to said loop circuit; and output connection means for receiving a portion of the energy of the oscillations within said second circuit.

10. A frequency divider system for dividing a high frequency input signal of a predetermined frequency $f$ to provide an output signal of a subharmonic $f/n$ comprising: a first high frequency tunable, high impedance parallel resonant circuit having capacitive and inductive characteristics enhancing resonance at the subharmonic frequency $f/n$; a second high frequency tunable, high impedance parallel resonant circuit having capacitive and inductive characteristics enhancing resonances at a frequency $f(1-1/n)$; a variable reactance device; said first circuit, said second circuit, said variable reactance device being connected in a loop circuit such that any oscillations in either of said resonant circuits tend to regeneratively influence the other of said resonant circuits; connection means for applying the high frequency input signal across a portion of said loop circuit including a series connection of said variable reactance device and said first circuit whereby said first circuit will tend to resonate at the said subharmonic frequency $f/n$ without the provision of any additional high frequency energy to said loop circuit; and output connection means for receiving a portion of the energy of the oscillations within said first circuit.

References Cited in the file of this patent

UNITED STATES PATENTS

| | | |
|---|---|---|
| 2,243,921 | Rust | June 3, 1941 |
| 2,424,236 | Huge | July 22, 1947 |
| 2,443,094 | Carlson | June 8, 1948 |
| 2,719,223 | Van Der Zeil | Sept. 27, 1955 |
| 2,944,205 | Keizer | July 5, 1960 |

OTHER REFERENCES

"Masers and Parametric Amplifiers Introduction" by H. Heffner of Stanford University, 1958 Wescon Convention Record, part 3, pages 3–8.

"Gain, Bandwidth and Noise Characteristics of the Variable-Parameter Amplifier" by H. Heffner and G. Wade of Stanford University, Journal of Applied Physics, pages 1320–1331, volume 29, Number 9, September 1958.